US 6,731,108 B2

(12) United States Patent
Zalunardo et al.

(10) Patent No.: US 6,731,108 B2
(45) Date of Patent: May 4, 2004

(54) DEVICE WITH A MAGNETIC POSITION ENCODER

(75) Inventors: Ivano Zalunardo, Petit-Lancy/Genéve (CH); Christian Schott, Morges (CH); Radivoje Popovic, St-Sulpice (CH)

(73) Assignee: Sentron AG, Zug (CH)

( * ) Notice: Subject to any disclaimer, the term of this patent is extended or adjusted under 35 U.S.C. 154(b) by 6 days.

(21) Appl. No.: 10/103,589

(22) Filed: Mar. 20, 2002

(65) Prior Publication Data

US 2002/0167306 A1 Nov. 14, 2002

(30) Foreign Application Priority Data

Mar. 23, 2001 (EP) .............................. 01810298
Oct. 16, 2001 (EP) .............................. 01203922

(51) Int. Cl.⁷ .............................. G01B 7/14; G01B 7/30
(52) U.S. Cl. .............................. 324/207.2; 324/207.22; 324/207.24
(58) Field of Search .................. 324/207.26, 207.2, 324/207.21, 207.22, 207.25, 173, 174, 207.24; 702/150–152; 341/15

(56) References Cited

U.S. PATENT DOCUMENTS

| 4,893,502 A |   | 1/1990  | Kubota et al.          |
|-------------|---|---------|------------------------|
| 5,530,345 A | * | 6/1996  | Murari et al. ............ 324/207.2 |
| 5,570,015 A | * | 10/1996 | Takaishi et al. ........ 324/207.21 |
| 5,929,631 A | * | 7/1999  | Striker et al. .......... 324/207.21 |
| 6,018,881 A | * | 2/2000  | Spies ........................ 33/706 |
| 6,097,183 A | * | 8/2000  | Goetz et al. ............ 324/207.12 |
| 6,100,681 A | * | 8/2000  | Tsuruta ................... 324/207.2 |
| 6,205,866 B1 | * | 3/2001 | Ullmann et al. ........ 73/862.333 |
| 6,265,867 B1 | * | 7/2001 | Fowler ................... 324/207.25 |
| 6,288,533 B1 | * | 9/2001 | Haeberli et al. ......... 324/207.2 |
| 6,509,732 B1 | * | 1/2003 | Rhodes et al. ......... 324/207.12 |
| 6,522,130 B1 | * | 2/2003 | Lutz ....................... 324/207.2 |

FOREIGN PATENT DOCUMENTS

| DE | 197 12 829 A1 | 10/1998 |
| EP | 0 590 222 A1 | 4/1994 |
| EP | 0 726 448 A1 | 8/1996 |
| EP | 0 979 988 A1 | 2/2000 |
| EP | 1 074 815 A1 | 2/2001 |
| WO | WO 97 25592 | 7/1997 |
| WO | WO 98 54547 | 12/1998 |

* cited by examiner

Primary Examiner—N. Le
Assistant Examiner—Darrell Kinder
(74) Attorney, Agent, or Firm—McCormick, Paulding & Huber LLP

(57) ABSTRACT

A magnetic position encoder comprises a magnetic field source and a magnetic field sensor which are movable relative to each other along a given path. The magnetic field sensor measures two components of the magnetic field produced by the magnetic field source. From the measured components a position signal is then derived which represents the relative position of the magnetic field sensor and magnetic field source. Embodiments of the position encoder in accordance with the invention are characterised in that the determination of the position signal includes a division of the two measured components of the magnetic field. These embodiments in accordance with the invention have the advantage that the position signal is a linear function of the position.

18 Claims, 6 Drawing Sheets

DEVICE WITH A MAGNETIC POSITION ENCODER

CROSS REFERENCE TO RELATED APPLICATIONS

Figure 1:
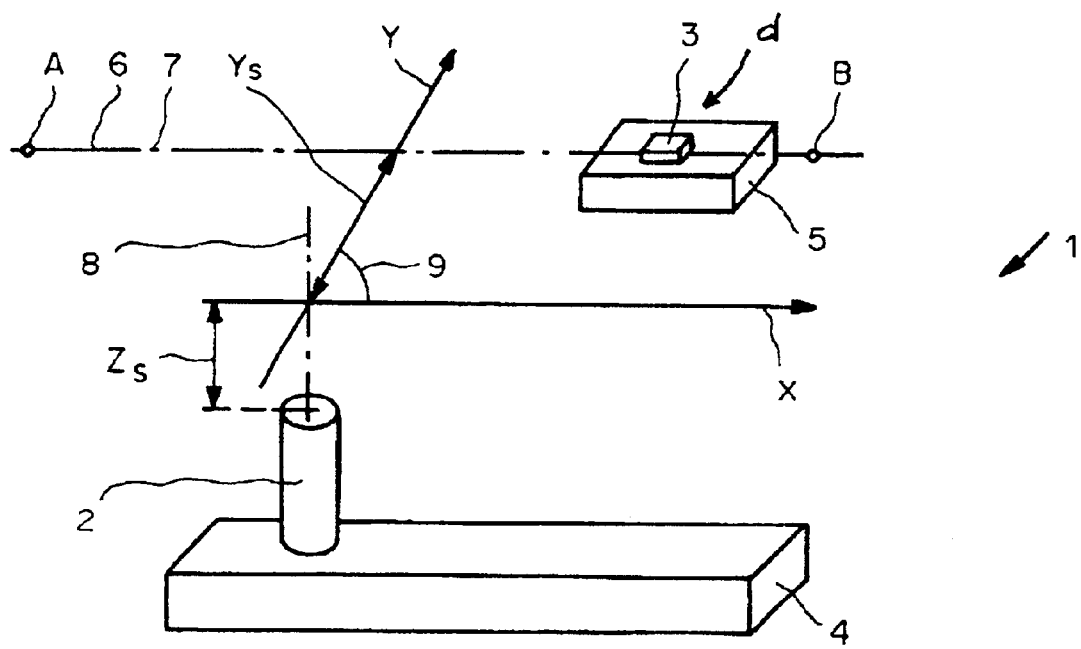

This application claims priority under 35 U.S.C §119 from and incorporates by reference the subject matter of European Patent Application No. 01810298.8 filed Mar. 23, 2001 and European Patent Application No. 01203922.8 filed Oct. 16, 2001.

FIELD OF THE INVENTION

The invention concerns a device with a magnetic position encoder.

BACKGROUND OF THE INVENTION

Today, contactless position encoders for distances in the sub-millimetre range are used in large numbers in devices for the engineering and automobile industries.

In applications with which the position encoders are exposed to dirt such as dust, fibres, oil gases, etc, magnetic position encoders present a robust and economic alternative to the widely used optical position encoders because they do not require a sealed enclosure between the moving and stationary machine parts of the device.

A device with a magnetic position encoder is known from DE 197 12 829. This device has a piston with a ring-shaped magnet which is movable along an axis. For determining the position of the piston, two magnetic field sensors are foreseen one of which measures the component of the magnetic field produced by the magnet in axial direction and the other one measures the component of the magnetic field produced by the magnet in radial direction. Here, the axial direction of the magnetic field corresponds to the movement direction of the piston. Because the output signals of the two magnetic field sensors are non-linear, the device is not suitable for determining a position signal corresponding to the continuous position of the piston but only for determining whether the piston has reached a predefined position.

A similar device is known from EP 1 074 815. Here, it is suggested that the output signals of the two magnetic field sensors are combined in order to get a position signal which is suitable for determining the continuous position of the piston. The disadvantage is that this position signal is also non-linear.

A further device for determining whether an element has reached a predetermined positioned is known from EP 726 448.

The object of the invention is to develop a device with a magnetic position encoder which delivers a linear signal over a comparatively large working range.

BRIEF DESCRIPTION OF THE INVENTION

The magnetic position encoder naturally comprises a magnetic field source and a magnetic field sensor which are movable relative to each other along a given path. The magnetic field sensor measures two components of the magnetic field produced by the magnetic field source. A position signal is then derived from the measured components which represents the relative position of magnetic field sensor and magnetic field source. Designs of the position encoder in accordance with the invention are characterised in that the determination of the position signal includes a division of the two measured components of the magnetic field. These designs in accordance with the invention demonstrate the advantage that the position signal is a linear function of the location.

With a preferred embodiment with which the magnetic field source and the magnetic field sensor move relative to each other along a straight line, the magnetic field produced by the magnetic field source is rotationally symmetric in relation to an axis of symmetry. In accordance with the invention, the magnetic field sensor measures two components of the magnetic field both of which lie in a plane running orthogonally to the axis of symmetry of the magnetic field source. With the relative movement of the magnetic field source and the magnetic field sensor, the direction of the magnetic field in this plane changes in relation to the measurement directions defined through the magnetic field sensor. From this change in direction, a linear position signal can be obtained by means of a division of the two measured magnetic field components.

Even when the magnetic field sensor is arranged rigidly and the magnetic field source moves on a circular path, an almost linear position signal can be obtained from the quotient of the two magnetic field components measured in a specific working range.

In the following, embodiments of the invention are explained in more detail based on the drawing.

BRIEF DESCRIPTION OF THE DRAWING FIGURES

It is shown in

Figure 2:
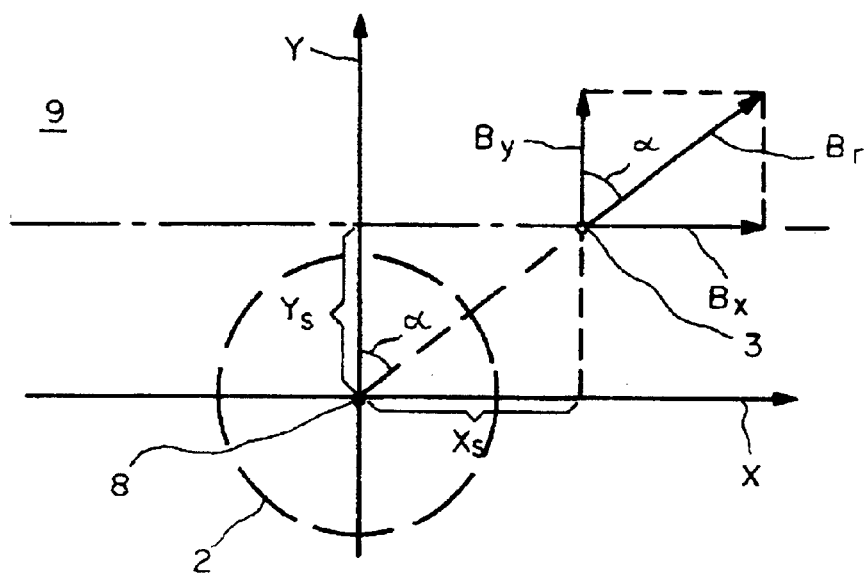
Figure 3:
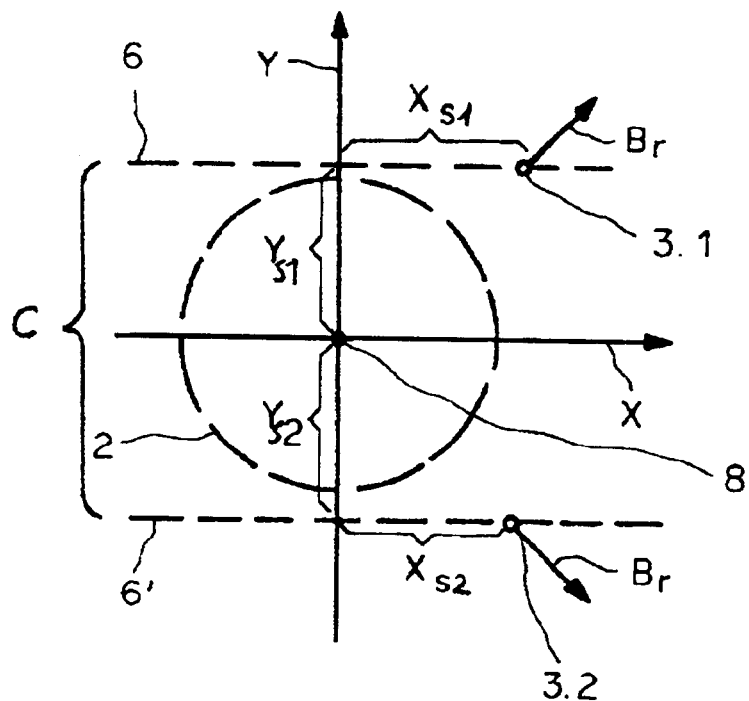
Figure 4:
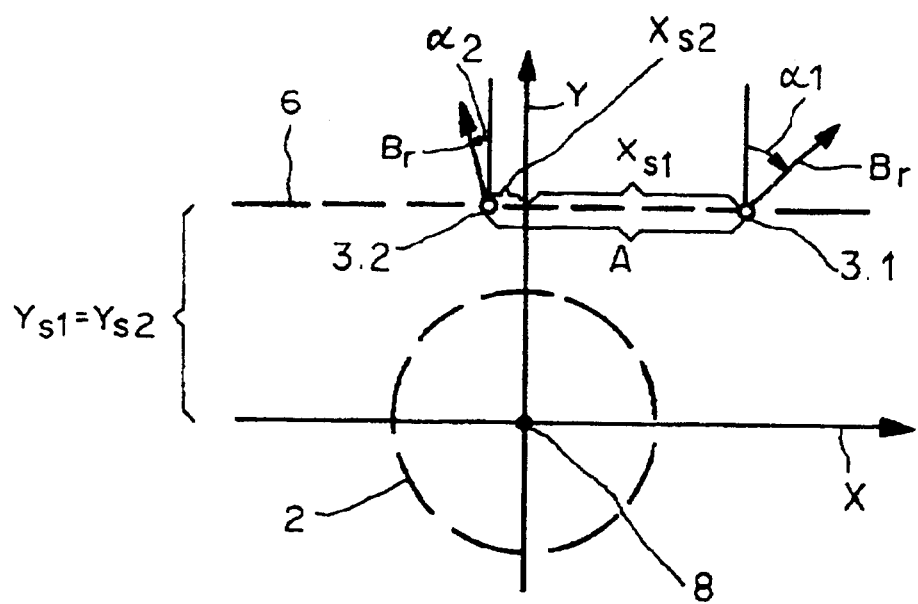
Figure 5:
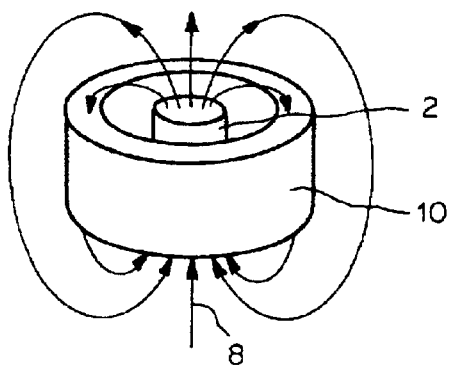
Figure 6:
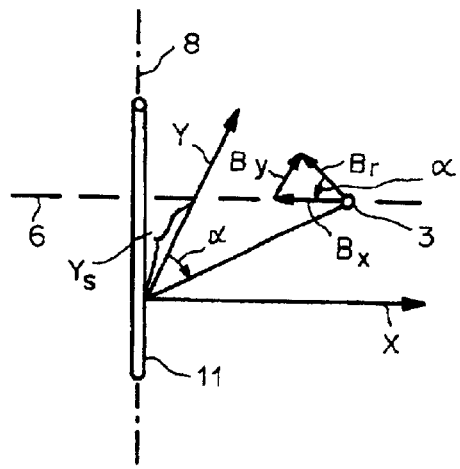
Figure 7:
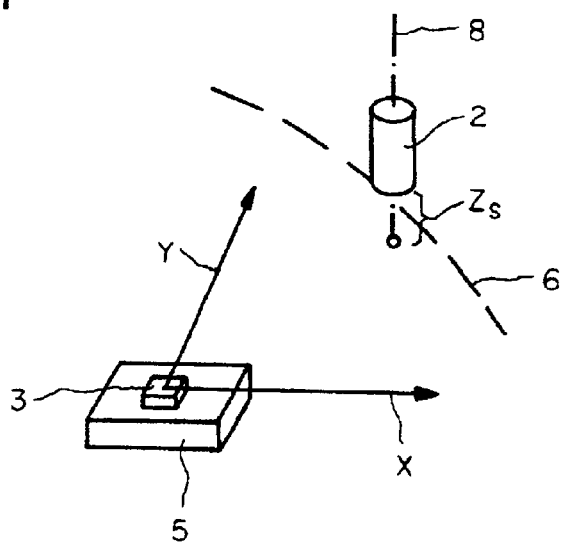
Figure 8:
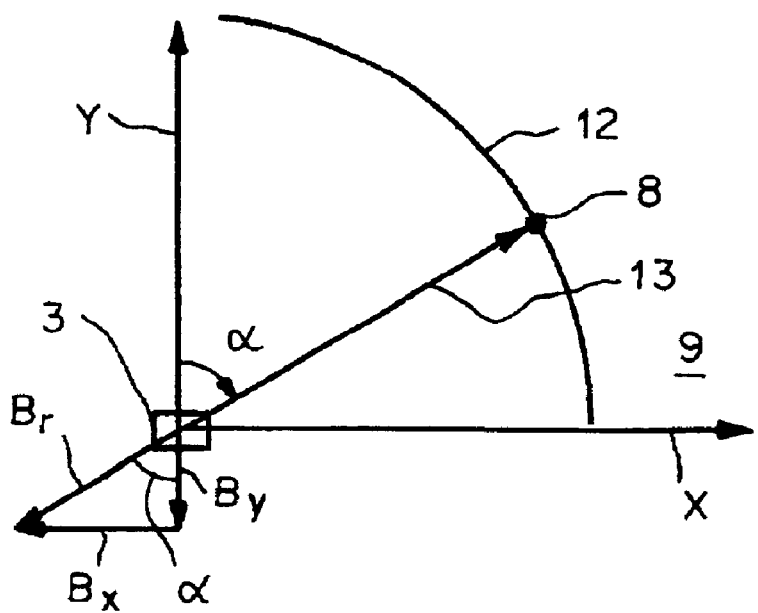
Figure 9:
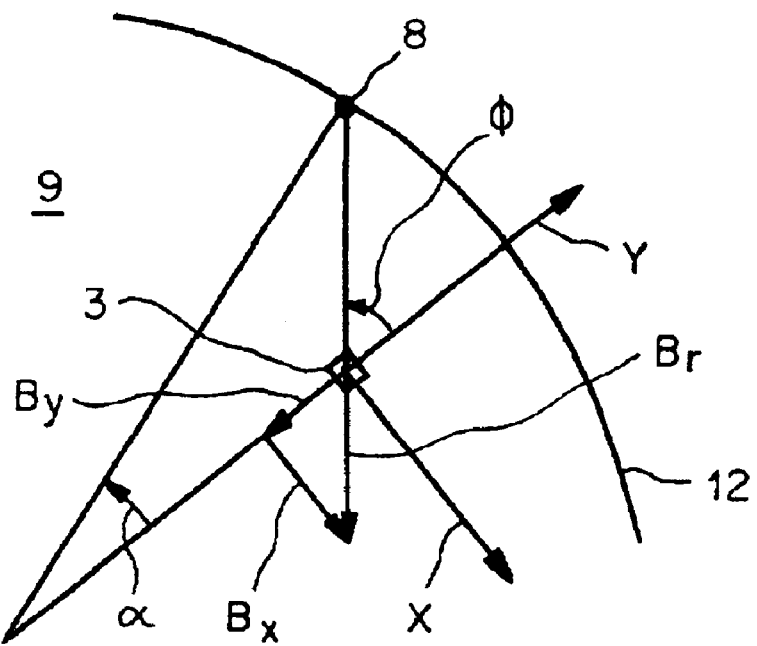
Figure 11:
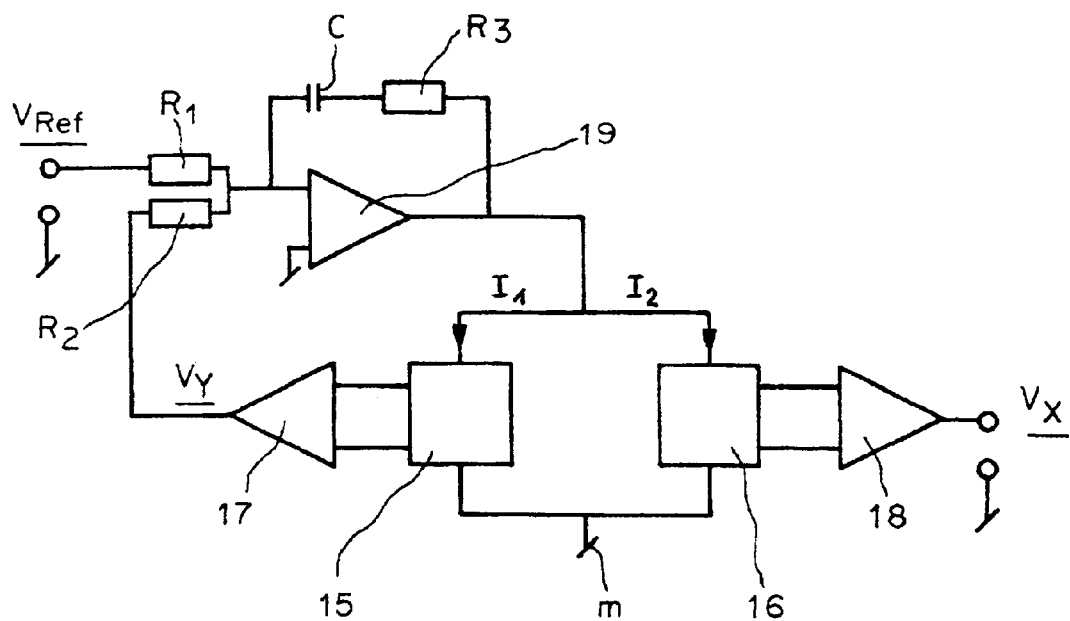

FIG. 1 a device with a magnetic position encoder,

FIG. 2 geometric relationships prevailing in a measurement plane,

FIGS. 3, 4 a magnetic position encoder with two sensors,

FIG. 5 a magnetic field source with a magnetic field with radial symmetry,

FIG. 6 a magnetic field source with a magnetic field with circular symmetry,

FIG. 7 a further magnetic position encoder,

FIGS. 8, 9 geometric relationships prevailing in the measurement plane,

FIG. 10 a diagram,

FIG. 11 an electronic circuit, and

Figure 12:
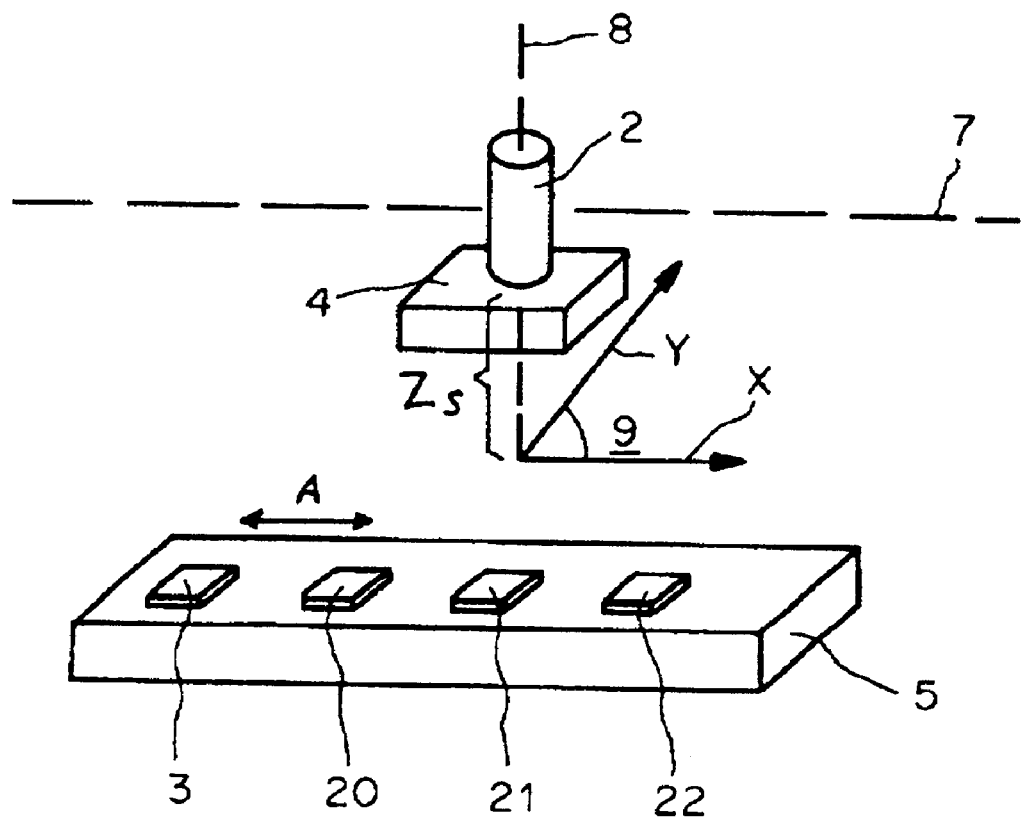

FIG. 12 a magnetic position encoder with several magnetic field sensors.

DETAILED DESCRIPTION OF THE INVENTION

FIG. 1 shows schematically a device 1 with a magnetic position encoder which comprises a magnetic field source 2 and a magnetic field sensor 3. The device 1 has a first part 4 and a second part 5, the position of which relative to each other is changeable in a way which is not explained in more detail. The magnetic field source 2 is secured to the first part 4. The magnetic field sensor 3 is secured to the second part 5. When the position of the second part 5 is changed relative to the position of the first part 4 from a first limit position A to a second limit position B, then the magnetic field sensor 3 moves on a predefined path 6 relative to the position of the magnetic field source 2. The relative position of the two parts 4 and 5 to each other can be characterised by means of one single variable X which corresponds to the actual location d of the magnetic field sensor 3 on the path 6. Therefore, the magnetic position encoder serves to determine the actual value of the variable X(d).

With the example presented in FIG. 1 the first part 4 of the device 1 with the magnetic field source 2 is arranged stationary and the second part 5 with the magnetic field sensor 3 is movable along a given straight line 7 between the two limit positions A and B. A cylindrical permanent magnet is foreseen as the magnetic field source 2. The magnetic field B produced by the permanent magnet is rotationally symmetrical in relation to an axis of symmetry 8 running in the longitudinal direction of the permanent magnet. The straight line 7 and the axis of symmetry 8 run orthogonally to one another. The path 6 therefore runs in a plane 9 running orthogonally to the axis of symmetry 8. The axes of a cartesian system of co-ordinates of plane 9 the origin of which coincides with the piercing point of the axis of symmetry 8 of the permanent magnet are marked with x and y. The straight line 7 runs parallel to the x axis at a distance $Y_S$. The co-ordinates of the magnetic field sensor 3 in plane 9 are marked with ($X_S$, $Y_S$) whereby the value $X_S$ changes with alteration of the relative position of the two parts 4 and 5 of the device while the value $Y_S$ remains constant. Furthermore, the plane 9 runs at a predetermined distance $Z_S$ above the upper end of the permanent magnet.

FIG. 2 shows a plan view of plane 9. The permanent magnet arranged below the plane 9 is represented by a broken line. The rotational symmetry of the magnetic field B produced by the permanent magnet means that in plane 9 the field lines run radially in relation to the origin of the xy system of co-ordinates. The component of the magnetic field B lying in the plane 9 at the location ($X_S$, $Y_S$) of the magnetic field sensor 3 is represented by the vector $B_r$. The magnetic field sensor 3 measures the components $B_x$ and $B_y$ of the magnetic field B. According to the following equation $$\tan(\alpha) = \frac{B_x}{B_y} = \frac{X_S}{Y_S} \quad (1)$$

its x co-ordinate $X_S$ can be determined as $$X_S = Y_S \frac{B_x}{B_y} \quad (2)$$

The angle $\alpha$ designates the angle between the direction of the radial component $B_r$ of the magnetic field and the y axis. The variable $X_S$ therefore represents the position signal that is basically obtained by means of the division of the two components $B_x$ and $B_y$.

Assembly related deviations in the distance $Z_S$ have practically no influence on the position signal: Although the absolute values of the components $B_x$ and $B_y$ change with the distance $Z_S$, their relationship does not change. Temperature related deviations in the sensitivity of the magnetic field sensor are also largely eliminated by their division. The distance $Z_S$ as well as the distance $Y_S$ are selected so that they are as large as possible in relation to the component $B_r$ of the magnetic field running radially to the axis of symmetry 8.

A magnetic field sensor suitable for this application based on the Hall effect which measures the two components of the magnetic field orientated orthogonally to each other is marketed by the applicant under the designation 2D-VH-11. A further suitable magnetic field sensor is described in the Japanese patent application No. 2000-356684. The use of magnetoresistive magnetic field sensors is also possible. The measuring axes drawn out from the magnetic field sensor 3 should be aligned as parallel as possible to the x axis or the y axis. Otherwise, the rotation has to be determined by means of a calibration measurement and taken into consideration by means of a co-ordinate transformation when determining the position signal.

With a cylindrical permanent magnet consisting of SmCo, the diameter of which amounted to 2 mm and the length 1 mm, for a path 6 which ran along the straight line 7 at a distance of Z=0.7 mm above the permanent magnet and at a lateral distance of $Y_S$=1.4 mm an output signal could be achieved in the working range of $X_S$=−1.5 mm to $X_S$=+1.5 mm the deviation of which from an ideal linear line amounted to less than ±0.5%. A rotation of the measuring axes of the magnetic field sensor 3 by 2° in relation to the xy system of co-ordinates of the plane 9 produced, without correction, an error, but the error was less than ±1.5% within the named working range of $X_S$=−1.5 mm to $X_S$=+1.5 mm.

If, as the result of unavoidable assembly tolerances, the distance $Y_S$ amounts to 1.5 mm for example instead of 1.4 mm, then the position signal $X_S$ according to the equation (2) is larger by a factor of 1.5/1.4. FIG. 3 shows an embodiment with two spatially separated magnetic field sensors 3.1 and 3.2 with which the dependence of the position signal $X_S$ on assembly related deviations is eliminated. Each of the two magnetic field sensors 3.1 and 3.2 produces an output signal according to the equation (2). The first magnetic field sensor 3.1 moves on the path 6 running parallel to the x axis, the second magnetic field sensor 3.2 moves on a path 6' also running parallel to the x axis. The distance between the two paths 6 and 6' is marked with C. The x co-ordinate of the first and second magnetic field sensors 3.1 and 3.2 is the same. With a typical value for distance C of 3 mm, the two magnetic field sensors 3.1 and 3.2 could, for example, be arranged as CMOS Hall elements on one single semiconductor chip together with the evaluation electronics. Their mutual alignment and distance are then perfectly reproducible.

The co-ordinates ($X_{S1}$, $Y_{S1}$) of the first magnetic field sensor 3.1 result $$\text{with ctan}(\alpha_1) = \frac{B_y(X_{S1}, Y_{S1})}{B_x(X_{S1}, Y_{S1})} = \frac{Y_{S1}}{X_{S1}} \text{ and}$$

$$\text{ctan}(\alpha_2) = \frac{B_y(X_{S2}, Y_{S2})}{B_x(X_{S2}, Y_{S2})} = \frac{Y_{S2}}{X_{S2}} \text{ and}$$

$$X_{S1} = X_{S2} \text{ as}$$

$$X_{S1} = \frac{C}{\text{ctan}(\alpha_1) + \text{ctan}(\alpha_2)} \text{ and}$$

$$Y_{S1} = \frac{C * \text{ctan}(\alpha_1)}{\text{ctan}(\alpha_1) + \text{ctan}(\alpha_2)}.$$

The variable ctan($\alpha_1$) results from the components $B_x$ and $B_y$ of the magnetic field measured by the first magnetic field sensor 3.1 and the variable ctan($\alpha_2$) results from the components $B_x$ and $B_y$ of the magnetic field measured by the second magnetic field sensor 3.2. The measured co-ordinate $X_{S1}$, of the first magnetic field sensor 3.1, which serves as the position signal of the position encoder, is independent of the distance $Y_{S1}$, of the magnetic field sensor 3.1 from the axis of symmetry 8 of the permanent magnet.

FIG. 4 shows a magnetic position encoder with two spatially separated magnetic field sensors 3.1 and 3.2, both of which move on the path 6 and are arranged one behind the other in the direction of the path 6 at distance A. A cylindrical, axially magnetised permanent magnet serves as the magnetic field source 2 which produces a magnetic field rotationally symmetrical in relation to its longitudinal axis. The co-ordinates ($X_{S1}$, $Y_{S1}$) of the first magnetic field sensor 3.1 result with $\tan(\alpha_1) = \frac{B_x(X_{S1}, Y_{S1})}{B_y(X_{S1}, Y_{S1})} = \frac{X_{S1}}{Y_{S1}}$ and $\tan(\alpha_2) = \frac{B_x(X_{S2}, Y_{S2})}{B_y(X_{S2}, Y_{S2})} = \frac{X_{S2}}{Y_{S2}}$ and $Y_{S1} = Y_{S2}$ in $X_{S1} = \frac{A*\tan(\alpha_1)}{\tan(\alpha_1) + \tan(\alpha_2)}$ and $Y_{S1} = \frac{A}{\tan(\alpha_1) + \tan(\alpha_2)}$.

The variable $\tan(\alpha_1)$ results from the components $B_x$ and $B_y$ of the magnetic field measured by the first magnetic field sensor 3.1 and the variable $\tan(\alpha_2)$ results from the components $B_x$ and $B_y$ of the magnetic field measured by the second magnetic field sensor 3.2.

The measured co-ordinate $X_{S1}$, of the first magnetic field sensor 3.1; which serves as position signal of the position encoder, is independent of the distance $Y_S$, of the magnetic field sensor 3.1 from the axis of symmetry 8 of the permanent magnet.

These position encoders with two magnetic field sensors can also be used as two-dimensional position encoders where the magnetic field source 2 and the measuring arrangement with the two magnetic field sensors 3.1 and 3.2 move relative to each other in a predefined plane, whereby the co-ordinates $X_{S1}$, and $Y_{S1}$, then represent two position signals.

FIG. 5 shows a device with a ferromagnetic yoke 10. The function of the yoke 10 consists in concentrating the magnetic field (presented with field lines) produced by the magnetic field source 2 in the area of plane 9. Here, both the magnetic field source 2 as well as the yoke 10 are rotationally symmetrical in relation to the axis of symmetry 8.

A coil can also serve as the magnetic field source 2 instead of the permanent magnet. The current flowing through the coil can then be modulated and the signal of the magnetic field sensor determined with the well known lock-in technique.

As is shown in FIG. 6, a conductor 11 with current flowing through it can also serve as the magnetic field source 2 instead of the permanent magnet. In this case, the magnetic field is also rotationally symmetrical in relation to the axis of symmetry 8. Whereas with the permanent magnet the direction of the magnetic field $B_r$ in the plane 9 is radial in relation to the axis of symmetry 8, with the conductor 11 with current flowing through it is circular. For this reason, for the co-ordinate $X_S$ of the magnetic field sensor 3 in this case, the following is valid:

$$X_S = Y_S \frac{B_y}{B_x} \quad (3).$$

The following embodiment presented in FIG. 7 corresponds to a large extent to the example shown in FIG. 1. However, the magnetic field source 2, preferably a cylindrical permanent magnet, in this example moves along a circular path 6 while the magnetic field sensor 3 is arranged rigidly in the centre of the circular path 6 but at a distance $Z_S$ below the lower end surface of the permanent magnet in the plane 9. The magnetic field sensor 3 again measures two Cartesian components $B_x$ and $B_y$ of the magnetic field produced by the magnetic field source 2 in the plane 9. The plane 9 runs orthogonally to the axis of symmetry 8 of the permanent magnet.

FIG. 8 shows the relationships in the plane 9. When the magnetic field source 2 moves along the circle 12, then the direction of the component of the magnetic field $B_r$ which lies in the plane 9 changes. The angle α between the y axis and the vector 13 which points from the origin of the xy system of co-ordinates to the piercing point of the axis of symmetry 8 in the plane 9 is suitable as the position signal. The following is valid:

$$\alpha = \arctan\frac{B_x}{B_y} \quad (3)$$

FIG. 9 shows the relationships in the plane 9 for an example with which the magnetic field sensor 3 is not arranged in the centre of the circle 12 but at any location, preferably a location where the distance of the magnetic field sensor 3 to the circular path 6 is less than the radius of the circular path 6. The measuring directions x and y of the magnetic field sensor 3 are orientated so that the component $B_r$ of the magnetic field lying in the plane 9 runs in the direction of the y axis when the angle α disappears. The angle between the magnetic field component $B_r$ and the y direction of the magnetic field sensor 3 is designated as angle φ. When the magnetic field sensor 3 is located relatively close to the circle 12, then small positional changes, ie, small changes to the angle α, within a given working range W cause comparatively large changes to the angle φ and therefore large changes to the measuring signal of the magnetic field sensor 3. In contrast to this is the disadvantage that the measuring signal is only in a limited working range approximately linear dependent on the angle α.

When the distance of the magnetic field source 2 from the centre point 14 of the circular path 6 is designated $R_1$ and the distance of the magnetic field sensor 3 from the centre point of the circular path 6 is designated $R_2$, then with the sine law $$\frac{\sin(\pi - \phi)}{R_1} = \frac{\sin(\phi - \alpha)}{R_2} \quad (4)$$

one achieves the relationship between the angle φ and the angle a as:

$$\phi = \arctan\left(\frac{R_1 \sin\alpha}{R_2 \cos\alpha - R_2}\right) \quad (5).$$

Figure 10:
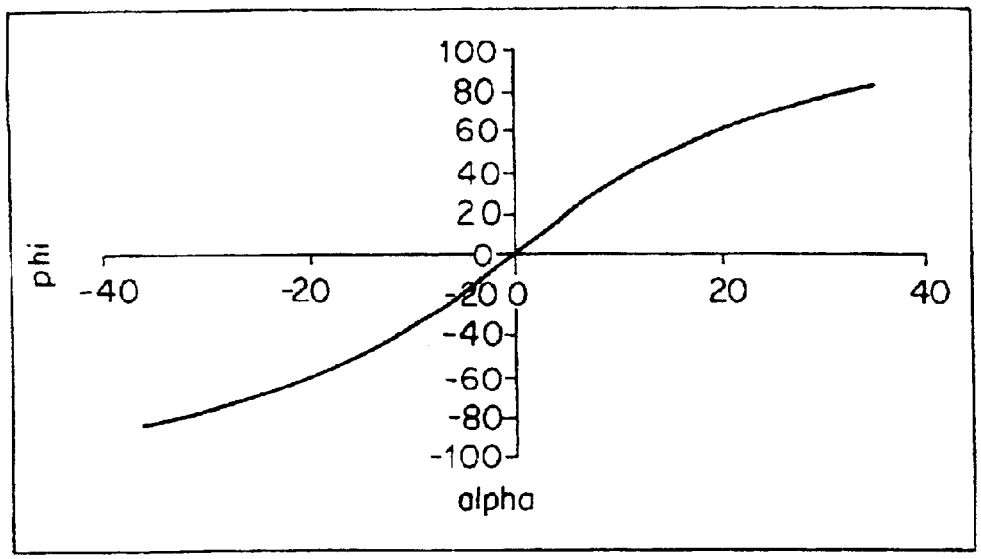

FIG. 10 shows the relationship φ(α) for the case $R_2 = \_R_1$. The relationship φ(α) is linear within ±1% in the range from α=−7° to α=+7°. In the case $R_2 = \_R_1$ the relationship φ(α) is linear within ±1% in the range from α=−3.5° to α=+3.5°.

From the signal obtained by means of the magnetic field sensor 3 from the components $B_x$ and $B_y$ of the magnetic field and from the relationship $$\phi = \arctan\frac{B_x}{B_y}$$

and equation (5) results the relationship $$\left(\frac{R_1 \sin\alpha}{R_2 \cos\alpha - R_2}\right) = \frac{B_x}{B_y} \quad (6).$$

The angle α can now be determined from the equation (6) as the position signal. The position signal α($B_x/B_y$) is, as demonstrated above, a linear function of the quotient $B_x/B_y$ within predetermined limits.

It should be noted here that in special cases where the magnetic field sensor 3 is arranged in the centre of the circle passing through the magnetic field source 2 it is not necessary that the magnetic field has any symmetry. A cylindrically shaped permanent magnet for example, the axis of symmetry of which points towards the centre of the circle, can also be used as the magnetic field source. Then $Z_S=0$ can also be selected.

FIG. 11 shows an electronic circuit for a magnetic field sensor 3 which has a first Hall element 15 for measuring the component $B_y$ and a second Hall element 16 for measuring the component $B_x$. The division of the measured components of the magnetic field takes place analogously because with this circuit the Hall voltage of the first Hall element 15 is kept constant and the current flowing through the second Hall element 16 is proportional to the current flowing through the first Hall element 15. The circuit deliver an output signal $V_{Out}$ which is proportional to the relationship $B_x/B_y$. A ground potential of the circuit is marked with m. The circuit comprises:

a first operational amplifier 17, which differentially picks up the Hall voltage set up between the two voltage contacts of the first Hall element 15 and acts as a reference in relation to the ground potential m. The output signal $V_y$ of the first operational amplifier 17 for an amplification factor of one is given by: $V_y=S_1*I_1*B_y$, whereby $I_1$ designates the current flowing through the first Hall element 15 and $S_1$ the sensitivity of the first Hall element 15.

a second operational amplifier 18, which differentially picks up the Hall voltage set up between the two voltage contacts of the second Hall element 16, amplifies it and acts as a reference in relation to the ground potential m. The output signal $V_x$ of the second operational amplifier 18 with an amplification factor of one is given by: $V_x=S_2*I_2*B_x$, whereby $I_2$ designates the current flowing through the second Hall element 16 and $S_2$ the sensitivity of the second Hall element 16. The output signal $V_x$ of the second operational amplifier 18 serves as the output signal $V_{Out}$ of the circuit: $V_{Out}=V_x$. Because both Hall elements 15 and 16 are connected in parallel and because, in addition, the two Hall elements 15 and 16 should have as far as possible the same characteristics, one has with good approximation $I_1=I_2$ and $S_1=S_2$.

a PI controller, comprising a third operational amplifier 19, a resistor $R_3$ and a capacitor C, the inverted input of which is connected via a first resistor $R_1$ to a reference voltage $V_{Ref}$ and via a second resistor $R_2$ to the output voltage $V_y$ of the first operational amplifier 17 and the non-inverted input of which is connected to ground. The controlling loop formed from the first Hall element 15 and the first operational amplifier 17 adjusts to $V_y=-V_{Ref}$ if $R_1=R_2$.

The output of the third operational amplifier 19 supplies one current contact each of the first and second Hall elements 15 and 16 while the other current contact of the two Hall elements 15 and 16 is connected to ground m.

By means of converting the equation, one gets $V_{out}=-V_{Ref}*B_x/B_y$.

The following examples concern magnetic position encoders with which either at least one further magnetic field sensor or at least one further magnetic field source is foreseen in order to enlarge the linear working range.

FIG. 12 shows a device with a magnetic position encoder with which a second and optionally a third, fourth, etc. magnetic field sensor 20, 21 and 22 is arranged on the part 5. The magnetic field sensors 3, 20, 21 and 22 are arranged at a predetermined distance A in movement direction, ie, in the direction of the straight line 7. With the numerical example explained based on FIGS. 1 and 2, the signal of the magnetic field sensor 3 was linear in a range from $X_S=-1.5$ mm to $X_S=+1.5$ mm with a given accuracy of ±2%. If the distance A is now fixed at A=3 mm then one of the magnetic field sensors 3, 20, 21 or 22 is always located in its linear working range. Because the signal of the magnetic field sensors 3, 20, 21 and 22 is monotonous according to the equation (2), that signal which belongs to the magnetic field sensor which is located in the linear range can be determined from the four signals of the magnetic field sensors 3, 20, 21 and 22. This is namely always the signal with the lowest absolute value.

A further possibility for enlarging the working range consists in using several magnetic field sources, eg, a magnetic tape with periodically changing direction of the magnetising North-South As a rule however two magnetic field sensors are then necessary so that at least one always delivers a usable signal. In this way, possible dead zones of the magnet field produced can be overridden.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

What is claimed is:

1. A magnetic position encoder comprising:
    a magnetic field source producing a magnetic field rotationally symmetrical relative to an axis of symmetry;
    a magnetic field sensor positioned movably relative to the magnetic field source and producing first and second signals representative of a first and second components of the magnetic field respectively, the first and second components being orthogonal to each other and lying in a plane that is orthogonal to the axis of symmetry of the magnetic field; and
    an electronic signal processing circuit connected to the magnetic field sensor to receive the first and second signals and processing the signals to produce a position signal representative of the relative position between the magnetic field source and the magnetic field sensor, the processing circuit providing the position signal as an output signal that is proportional to a division of the first signal by the second signal.

2. A magnetic position encoder according to claim 1 wherein the magnetic field sensor includes a first Hall element sensitive to the first component of the magnetic field and producing the first signal and a second Hall element sensitive to the second component of the magnetic field and producing the second signal, and wherein the electronic signal processing circuit provides a constant Hall voltage to the first Hall element and provides a current through the second Hall element that is proportional to a current flowing through the first Hall element and provides a Hall voltage of the second Hall element as an output voltage and the position signal.

3. A magnetic position encoder according to claim 1, further comprising a ferromagnetic yoke for concentrating the magnetic field in the plane orthogonal to the axis of symmetry of the magnetic field.

4. A magnetic position encoder according to claim 2, further comprising a ferromagnetic yoke for concentrating the magnetic field in the plane orthogonal to the axis of symmetry of the magnetic field.

5. A magnetic position encoder comprising:

a magnetic field source producing a magnetic field which is rotationally symmetric in relation an axis of symmetry;

first and second magnetic field sensors, each sensor measuring a first and a second component of the magnetic field and producing first and second signals representative of the first and second components respectively, the first and second components being oriented orthogonal to each other and lying in a plane that is orthogonal to the axis of symmetry of the magnetic field, the first and second magnetic field sensors being separated by a fixed distant and being jointly movable relative to the magnetic field source; and an electronic circuit connected to the first and second magnetic field sensors receiving the signals from the first and second magnetic field sensors and processing the signals to produce at least one position signal representative of the relative position between the magnetic field source and one of the magnetic field sensors, the circuit providing the position signal as an output signal that is derived from a division of the first signal produced by the first magnetic field sensor by the second signal produced by the first magnetic field sensor and a division of the first signal produced by the second magnetic field sensor by the second signal produced by the second magnetic field sensor.

6. A magnetic position encoder according to claim 5 wherein each of the first and second magnetic field sensors includes a first Hall element sensitive to the first component of the magnetic field and producing the first signals and a second Hall element sensitive to the second component of the magnetic field and producing the second signals, and wherein the electronic circuit provides to each of the first and second magnetic field sensors a constant Hall voltage to the first Hall element and a current through the second Hall element that is proportional to a current flowing through the first Hall element, and provides a Hall voltage of the second Hall element as the position signal representative of the relative position between the magnetic field source and the magnetic field sensor.

7. A magnetic position encoder according to claim 5, further comprising a ferromagnetic yoke for concentrating the magnetic field in the plane orthogonal to the axis of symmetry of the magnetic field.

8. A magnetic position encoder according to claim 6, further comprising a ferromagnetic yoke for concentrating the magnetic field in the plane orthogonal to the axis of symmetry of the magnetic field.

9. A magnetic position encoder for use with a magnetic field source, the magnetic field encoder comprising:

a magnetic field sensor movably positionable relative to a magnetic field source producing a magnetic field rotationally symmetrical relative to an axis of symmetry, the magnetic field sensor producing first and second signals representative of first and second components of the magnetic field respectively when the magnetic field sensor is positioned relative to the magnetic field source, the first and second components being orthogonal to each other and lying in a plane that is orthogonal to the axis of symmetry of the magnetic field; and an electronic signal processing circuit connected to the magnetic field sensor to receive the first and second signals and processing the signals to produce a position signal representative of the relative position between the magnetic field source and the magnetic field sensor, the processing circuit providing the position signal as an output signal that is proportional to a division of the first signal by the second signal.

10. A magnetic position encoder according to claim 9 wherein the magnetic field sensor includes a first Hall element sensitive to the first component of the magnetic field and producing the first signal and a second Hall element sensitive to the second component of the magnetic field and producing the second signal, and wherein the electronic signal processing circuit provides a constant Hall voltage to the first Hall element and provides a current through the second Hall element that is proportional to a current flowing through the first Hall element and provides a Hall voltage of the second Hall element as an output voltage and the position signal.

11. A magnetic position encoder according to claim 9, further comprising a ferromagnetic yoke for concentrating the magnetic field in the plane orthogonal to the axis of symmetry of the magnetic field.

12. A magnetic position encoder according to claim 10, further comprising a ferromagnetic yoke for concentrating the magnetic field in the plane orthogonal to the axis of symmetry of the magnetic field.

13. A magnetic position encoder according to claim 10, wherein the electronic signal processing circuit the first Hall element connected in parallel with the second Hall element.

14. A magnetic position encoder for use with a magnetic field source, the magnetic position encoder comprising:

first and second magnetic field sensors separated by a fixed distant and jointly positionable for movement relative to a magnetic field source producing a magnetic field rotationally symmetrical relative to an axis of symmetry, each sensor for measuring a first and a second component of the magnetic field and producing first and second signals representative of the first and second components respectively when the first and second magnetic field sensors are jointly positioned relative to the magnetic field source, the first and second components being oriented orthogonal to each other and lying in a plane that is orthogonal to the axis of symmetry of the magnetic field, an electronic circuit connected to the first and second magnetic field sensors receiving the signals from the first and second magnetic field sensors and processing the signals to produce at least one position signal representative of the relative position between the magnetic field source and one of the magnetic field sensors, the circuit providing the position signal as an output signal that is derived from a division of the first signal produced by the first magnetic field sensor by the second signal produced by the first magnetic field sensor and a division of the first signal produced by the second magnetic field sensor by the second signal produced by the second magnetic field sensor.

15. A magnetic position encoder according to claim 14 wherein each of the first and second magnetic field sensors includes a first Hall element sensitive to the first component of the magnetic field and producing the first signals and a second Hall element sensitive to the second component of the magnetic field and producing the second signals, and wherein the electronic circuit provides to each of the first and second magnetic field sensors a constant Hall voltage to the first Hall element and a current through the second Hall element that is proportional to a current flowing through the first Hall element, and provides a Hall voltage of the second Hall element as the position signal representative of the of the relative position between the magnetic field source and the magnetic field sensor.

16. A magnetic position encoder according to claim 14, further comprising a ferromagnetic yoke for concentrating the magnetic field in the plane orthogonal to the axis of symmetry of the magnetic field.

17. A magnetic position encoder according to claim 15, further comprising a ferromagnetic yoke for concentrating the magnetic field in the plane orthogonal to the axis of symmetry of the magnetic field.

18. A magnetic position encoder according to claim 15 wherein the electronic circuit includes for each of the first and second magnetic field sensors the first Hall element connected in parallel with the second Hall element.

* * * * *

UNITED STATES PATENT AND TRADEMARK OFFICE
CERTIFICATE OF CORRECTION

| | | |
|---|---|---|
| PATENT NO. | : 6,731,108 B2 | Page 1 of 1 |
| APPLICATION NO. | : 10/103589 | |
| DATED | : May 4, 2004 | |
| INVENTOR(S) | : Ivano Zalunardo et al. | |

It is certified that error appears in the above-identified patent and that said Letters Patent is hereby corrected as shown below:

Title Page #54

In the title:

In the title, please delete "Device With A Magnetic Position Encoder" and insert -- Magnetic Position Encoder --.

In the claims:

Column 10, Line 26, please insert --includes--after circuit.

Signed and Sealed this

Nineteenth Day of September, 2006

JON W. DUDAS
*Director of the United States Patent and Trademark Office*